March 5, 1957 S. J. KOPEC Re. 24,284

BROACH ASSEMBLY

Original Filed Nov. 5, 1951

INVENTOR
STANLEY J. KOPEC
BY
Florian G. Miller
ATTORNEY

United States Patent Office

Re. 24,284

Reissued Mar. 5, 1957

24,284

BROACH ASSEMBLY

Stanley J. Kopec, Northville, Mich.

Original No. 2,629,294, dated February 24, 1953, Serial No. 254,897, November 5, 1951. Application for reissue February 23, 1955, Serial No. 490,163

4 Claims. (Cl. 90—33)

Matter enclosed in heavy brackets [ ] appears in the original patent but forms no part of this reissue specification; matter printed in italics indicates the additions made by reissue.

This invention relates generally to broaches and more particularly to broaches for cutting helical teeth on the bands surrounding a projectile.

In utilizing broaches to cut helical teeth, it has heretofore required a ten or more section broach to cut the helical teeth. It has also been necessary to use a helixing driver and clamping means for holding the projectile while it passes through the broach rings. This clamping means is necessary to prevent the projectile from wandering from a true helical path. *Prior broaches have teeth which are generally of the same width as the space between the teeth being formed so that each tooth cuts a portion from the depth between the teeth and in so doing, finish cuts a segment of the flank of the tooth being formed. Only a small cut can be taken by each prior broach from either the root or sides of the tooth in that the cut made by each ring must be finished cut on the flank of the tooth and, further, because there is a problem in disposing of the chips cut by each broach ring. Further, prior broaches* [These prior broaches have had the same tooth form on each broach ring, each successive ring having a slightly smaller minor diameter. Only a small cut can be taken by each broach with these prior broaches from either the root or sides of a tooth in that there is no place for the chips to go. They are usually arranged so that one broach ring cuts the sides of a tooth and the next broach ring the roots so that the chips will not interfere. They] generate considerable heat and they are difficult to lubricate at the cutting points of the teeth.

It is, accordingly, an object of my invention to provide a novel broach for cutting helical teeth which is simple in construction, economical in cost, economical in manufacture, and efficient in operation.

Another object of my invention is to provide a novel broach for cutting helical teeth whereby one section thereof rough cuts the teeth and the last section finishes the teeth.

Another object of my invention is to provide novel means for cooling a broach so that high production may be obtained.

Another object of my invention is to provide novel means for lubricating broach teeth.

Another object of my invention is to provide a novel machine utilizing a two section broach for cutting helical teeth, particularly on the bands surrounding a projectile.

Another object of my invention is to provide a depository for the chips in a broach assembly.

Other objects of my invention will become evident from the following detailed description, taken in conjunction with the accompanying drawings, in which—

Figure 1:
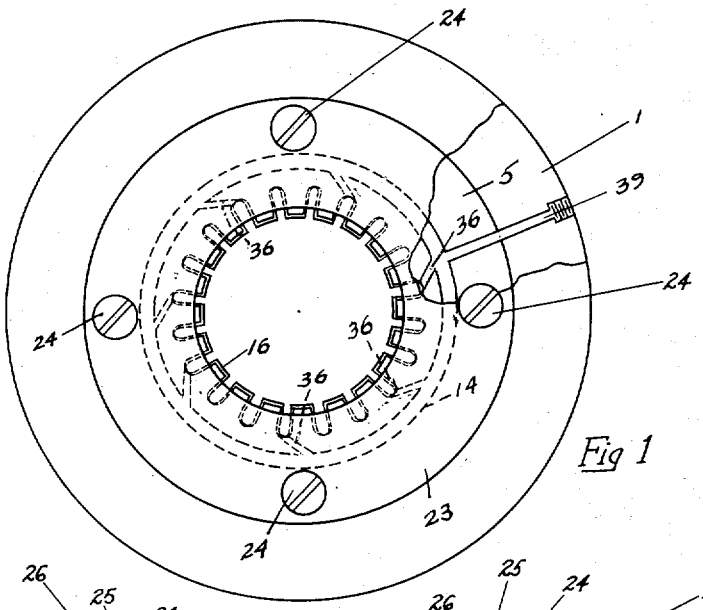
Fig. 1 is a plan view of my novel broach assembly.
Figure 2:
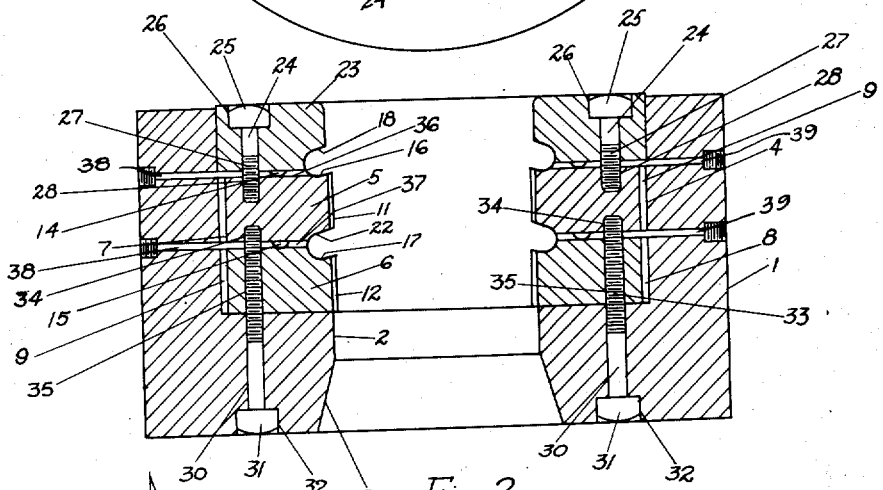
Fig. 2 is a view taken on the line 2—2 of Fig. 1.
Figure 3:
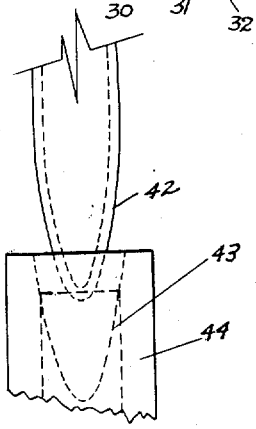
Fig. 3 is a side elevational fragmentary view of a guide member disposed in alignment with the broach for guiding a projectile through the broach.

Referring now to the drawings, I show in Figs. 1 and 2 a cup-shaped supporting member 1 having an axially extending aperture 2 tapered at 3 and counterbored at 4. Annular broach rings 5 and 6 are disposed in the counterbore 4 in axial alignment, the rings 5 and 6 having longitudinally extending grooves 7 and 8 for engaging keys 9 in the counterbore 4. The broach ring 5 has helical shaped cutting teeth 11 for cutting the major portion of the sides and roots of teeth of a band on a projectile passing through the broach and the teeth 12 on the broach ring 6 are of a predetermined size and diameter to cut the finished tooth profile required on the band of the projectile. Each ring 5 and 6 has annular, semi-circular shaped, intermediate grooves 14 and 15 in the top side thereof and each ring 5 and 6 has an inner marginal groove 16 and 17. The groove 16 on the broach ring 5 merges with a marginal groove 18 on the under side of a pilot ring 23 to form an annular, open, downwardly inclined groove and the groove 17 on the broach ring 6 merges with a marginal groove 22 on the under side of the broach ring 5 to form an open, downwardly inclined, annular groove. The pilot ring 23 is disposed in the counterbore 4 of the support member 1 in axial alignment with the broach rings 5 and 6. The pilot ring 23 is connected to the broach ring 5 by screw bolts 24, the heads 25 of which nest in counterbores 26 and the threaded ends 27 of which engage threaded apertures 28 in the upper side of the broach ring 5. The broach rings 5 and 6 are connected together and to the support member 1 by axially extending screw bolts 30 having heads 31 nested in counterbores 32 in the lower side of the support member 1, the threaded ends 33 of the screw bolts 30 threadably engaging threaded apertures 34 and 35 in the broach rings 5 and 6, respectively. The annular grooves 14 and 15 are connected with the open, inner annular grooves by passages 36 and 37 which are tangent to the outer diameter of the open grooves so that air passing from the grooves 14 and 15 to the open inner grooves will move circularly therearound to cool the teeth of the broach rings and to cool the chips therin and move them in circular path. The inner open grooves provide a depository for chips cut from the bands of the projectiles. Air is passed to the grooves 14 and 15 through passageways 38 connected to a suitable source of air. Lubricant likewise may be passed into the circular grooves 14 and 15 through passageways 39 whereby it passes to the cutting teeth of the broach rings 5 and 6 to provide adequate lubrication.

Figure 4:
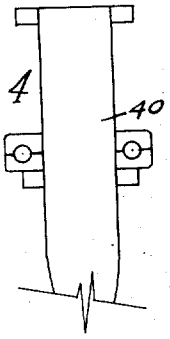
Fig. 4 is a fragmentary view showing a member for pushing a projectile through my novel broach assembly.

The axially extending width of the inner open grooves is preferably less than the width of the teeth to be formed on the workpiece in order that the workpiece will move in a true helical path without any tendency *for misalignment. The finish cutting ring has cutting edges on both the side edges and tips so that it will take stock off of both the sides and roots of the teeth being formed so that both the sides and roots will be finished over their entire area except the tip which is made up of the premachined blank. Since the projectile blank has been prefinished on the outer peripheral surface, the outer peripheral surface, therefore, forms a guiding surface to guide the blank through the broach* [to misalignment]. The internal *major* diameter of the pilot ring 23 is approximately the size of the diameter of the projectile so as to guide the projectile in a straight line *to position the projectile for passage through the broach* [through the broach assembly]. The pushing member shown in Fig. 4 is merely conventional and comprises a conventional rotatable shaft 40 which engages the end of the projectile to push it through the broach assembly. After the projectile passes through the broach assembly, the nose 42 thereof nests in the conical shaped recess 43 in the guide member 44 which is retractible when the shaft 40 pushes the projectile through the broach assembly to guide the projectile in a straight path through its passage in the broach ring assembly.

It will be evident from the foregoing description that I have provided a novel broach ring assembly which permits the completion of a broaching operation in a matter of seconds which increases production of present broach rings several times, which only needs two broach rings in the assembly, which is well lubricated, which keeps cool, and which provides for the chips resulting from the cutting operation.

Various changes may be made in the specific embodiment of my invention without departing from the spirit thereof or from the scope of the appended claims.

What I claim is:

[1. In a broach assembly, in combination, a holder, annular broach rings disposed in said holder, each of said broach rings having an annular intermediate groove on the upper side thereof and an annular marginal groove on the inner edge thereof, and a pilot ring disposed in axial alignment with said broach rings for axially piloting a cylindrical workpiece through said broach rings, said broach rings having passages connecting said intermediate annular grooves and said marginal grooves.]

[2. In a broach assembly as set forth in claim 1 wherein the under sides of said pilot ring and said broach ring adjacent thereto are marginally grooved to define an annular open groove.]

[3. In a broach assembly as set forth in claim 1 wherein the minor internal diameters of said broach rings progressively decrease.]

[4. In a broach assembly as set forth in claim 1 wherein the teeth of said broach rings are designed to cut both the roots and the sides of teeth on a cylindrical workpiece.]

[5. In a broach assembly as set forth in claim 1 wherein both of the inner marginal edges of the said broach rings are grooved whereby grooves on adjacent broach rings merge to define an open annular groove.]

[6. In a broach assembly as set forth in claim 1 wherein said passages are tangent to the periphery of the groove on the inner edges of said broach rings.]

7. A broach assembly comprising a cup-shaped member having a bore with a tapered end and a counterbore, annular broach rings axially aligned in said counterbore with internal cutting teeth of different minor diameters, said broach rings having annular grooves in the upper side thereof, marginal grooves on the inner margins thereof, and tangentially extending passages between said annular grooves and said inner marginal grooves, a pilot ring disposed in said counterbore, in axial alignment with said broach rings, means for securing said broach rings and said pilot ring in said counterbore, and means for securing a source of fluid to said grooves, *the cutting edges on one said ring rough cutting the sides and tips of said teeth being formed and said other ring having cutting edges on both sides and tips of said teeth finish cutting said sides and roots of the teeth being formed.*

8. A machine for cutting helical teeth on the bands of a projectile comprising a cup-shaped holding member having an axial bore with a counterbore, annular broach rings having cutting teeth with progressively smaller internal minor diameters disposed in the counterbore of said holding member, *said cutting teeth on one said broach ring having the smallest internal diameter having cutting edges on both the sides and tips thereof whereby said teeth thereon finish cut on both the sides and roots of said teeth being formed on said bands,* a pilot ring disposed in the counterbore of said holding member in axial alignment with said broach rings, said broach rings having intermediate circular groves in the upper side thereof, marginal grooves on the inner marginal edges thereof, and passages between said intermediate grooves and said marginal grooves tangential to said marginal grooves, means for securing said broach rings in said holding member, a rotatable pusher for pushing a projectile through said broach rings, and a retractible guiding member with a conical shaped recess for engaging the nose of a projectile when it passes through said broach rings to direct it in a straight path.

[9. A broaching machine for cutting helical teeth on bands of a projectile comprising a broach assembly having axially aligned, annular broach rings having internal helical cutting teeth with progressively decreasing minor internal diameters, said broach rings having annular grooves intermediate thereof, marginal grooves on the inner edges thereof, and passages tangential to said marginal grooves connecting said intermediate grooves and said marginal grooves, a source of air for passage to said annular grooves, means for pushing a projectile through said broach rings, and retractible means for guiding the nose of a projectile in an axial path after it passes through said broach rings.]

*10. A broach assembly for cutting teeth on a generally cylindrical blank comprising two juxtaposed axially aligned annular broach rings having helical cutting teeth on the inner sides thereof, the teeth on one said ring rough cutting and the teeth on the other said ring finish cutting, and means to guide a blank adapted to be machined through said broach rings, said teeth forming means to guide a blank therethrough in a helical path, said cutting teeth each having cutting edges on the sides and tips thereof, said cutting edges on one stage rough cutting the sides and tips of said teeth being formed and said other ring finish cutting said sides and tips of said teeth.*

*11. A broach assembly for cutting teeth on a cylindrical blank comprising two juxtaposed axially aligned annular broach rings having cutting teeth on the inner sides thereof, said cutting teeth on one said ring rough cutting and the teeth on the other said ring finish cutting said teeth, and means to guide a blank adapted to be machined through said broach rings, said teeth forming means to guide a blank therethrough, said teeth on one said ring having cutting edges on both the sides and tips thereof, said cutting edges finish cutting the sides and tips of said teeth being formed.*

References Cited in the file of this patent or the original patent

UNITED STATES PATENTS

| | | |
|---|---|---|
| 2,237,959 | Hansen et al. | Apr. 8, 1941 |
| 2,511,298 | Schinnerer | June 13, 1950 |

FOREIGN PATENTS

| | | |
|---|---|---|
| 9,438 | Great Britain | Dec. 31, 1919 |
| 370,220 | Great Britain | Apr. 7, 1932 |
| 419,276 | Great Britain | Nov. 8, 1934 |
| 866,793 | France | June 9, 1941 |